United States Patent
Takahashi et al.

(10) Patent No.: US 6,979,703 B2
(45) Date of Patent: Dec. 27, 2005

(54) ACOUSTICALLY MATCHING LAYER AND COMPOSITION THEREOF

(75) Inventors: Ikuo Takahashi, Chiba (JP); Hideshi Tomita, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 151 days.

(21) Appl. No.: 10/330,479

(22) Filed: Dec. 30, 2002

(65) Prior Publication Data

US 2003/0166745 A1 Sep. 4, 2003

(30) Foreign Application Priority Data

Mar. 4, 2002 (JP) .............................. 2002-057157

(51) Int. Cl.[7] .............................................. C08K 7/28
(52) U.S. Cl. ...................................... 523/219; 523/218
(58) Field of Search ................ 523/218–219; 528/44

(56) References Cited

U.S. PATENT DOCUMENTS

| | | | |
|---|---|---|---|
| 3,502,722 A | 3/1970 | Neumann ................... 260/566 |
| 4,042,558 A * | 8/1977 | von Bonin et al. .......... 523/219 |
| 4,111,713 A * | 9/1978 | Beck .......................... 106/409 |
| 5,114,982 A | 5/1992 | Mendelsohn et al. ......... 521/59 |
| 5,321,101 A | 6/1994 | Suzuki et al. ................ 525/452 |
| 5,434,305 A * | 7/1995 | Hennig et al. ............... 564/252 |
| 6,166,106 A * | 12/2000 | Purgett et al. ............... 523/172 |
| 6,566,437 B2 * | 5/2003 | Brown ........................ 524/506 |

FOREIGN PATENT DOCUMENTS

EP 0 973 150 A2 A3 7/1999

OTHER PUBLICATIONS

*DATABASE WPI* Section Ch, Week 199427, Derwent Publications, Ltd., London, GB; AN 1994-222050, XP002237882 & *JP 06 157749* A (Nisshinbo Ind. Inc.), Jun. 7, 1994.

* cited by examiner

*Primary Examiner*—Peter Szekely
(74) *Attorney, Agent, or Firm*—Westerman, Hattori, Daniels & Adrian, LLP

(57) ABSTRACT

It is an object of the present invention to provide a composition for an acoustically matching layer, having sufficient mechanical strength to allow itself to be easily formed, and capable of giving an acoustically matching layer highly stable in characteristics over extended periods even under high temperature and high humidity conditions. The present invention provides a composition containing a carbodiimide resin for an acoustically matching layer, where the composition may further contain inorganic hollow bodies or inorganic hollow bodies and another reactive resin; a process for producing a formed article of an acoustically matching layer by curing and forming under heating the composition in a mold for the acoustically matching layer; and an ultrasonic transducer using the same composition and ultrasonic transducer using the same formed article.

1 Claim, No Drawings

ACOUSTICALLY MATCHING LAYER AND COMPOSITION THEREOF

BACKGROUND OF THE INVENTION

1. Field of the Invention

The present invention relates to a composition containing a carbodiimide resin for an acoustically matching layer, a process for producing a formed article of an acoustically matching layer, and an ultrasonic transducer using the same composition and an ultrasonic transducer using the same formed article, more particularly a composition for an acoustically matching layer excellent in acoustically matching layer characteristics or the like and in stability for use for ultrasonic transducers, a process for producing a formed article of an acoustically matching layer, and an ultrasonic transducer using the same composition and an ultrasonic transducer using the same formed article.

2. Description of the Prior Art

Ultrasonic transducers which use a piezoelectric element to detect the presence or absence of an object or to find the distance to an object have been known. Ultrasonic waves, when traveling through an interface between dissimilar transmitting media, have decreasing transmittance as the difference in acoustic impedance between these media increases. A piezoelectric element, normally made of a ceramic material, has much higher acoustic impedance than air, and is useless for sensing purposes, because ultrasonic waves traveling through air are totally reflected or have greatly decreased transmittance when returning to the element.

For this reason, an ultrasonic transducer is provided with an acoustically matching layer between its piezoelectric element and the air, which has an acoustic impedance intermediate between those of the element and air, to impart a practical transmittance to the ultrasonic waves returning to the element after traveling through air.

An epoxy resin or the like has been normally used for an acoustically matching layer (or composition therefor) for ultrasonic transducers. For example, Japanese Patent Laid-Open Publication No.3-264000 discloses an acoustically matching layer material characterized by woody material for matching impedance between a transducer and medium for ultrasonic transducers, which use a ceramic material or the like. Japanese Patent Laid-open Publication No.8-65795 discloses an ultrasonic transducer, with a piezoelectric element fixed on its acoustically matching layer, characterized by the matching layer composed of an epoxy-based resin or the like mixed with glass balloons (hollow glass particles) and provided with a means for heating the layer. Japanese Patent Laid-open Publication No.10-224895 discloses an ultrasonic transducer which has a $\lambda/4$ acoustically matching layer fixed thereon with a piezoelectric element coated on one side with a synthetic resin (e.g., epoxy resin or the like) dispersed with glass balloons.

An acoustically matching layer (or composition therefore) for ultrasonic transducers which emit ultrasonic waves into a gaseous medium, e.g., air, necessarily has a density of around 0.4 to 0.7 $g/cm^3$, and is made of a sintered inorganic material or the like.

However, the acoustically matching layers which have been used or proposed for ultrasonic transducers involve various problems. For example, the one made of a woody material is highly moisture-absorptive and therefore sensitive to environments, and also has a fluctuating specific gravity or density, and it is difficult to control the formation and the like. The one made of a sintered inorganic material is fragile because of the necessity for keeping it at a low density, and hence difficult to handle and process. The one made of a formed resin is unstable in characteristics at high temperature because of the insufficient glass transition temperature and heat resistance of the resin, needs an additional step for preventing contamination with bubbles when glass balloons are kneaded into the resin, and also needs a pretreatment step with a coupling agent or the like because of insufficient adhesion to an inorganic material.

SUMMARY OF THE INVENTION

It is an object of the present invention to provide a composition for an acoustically matching layer, having a sufficient mechanical strength to allow itself to be easily formed, and capable of giving an acoustically matching layer highly stable in characteristics over extended periods even under high temperature and high humidity conditions.

The inventors of the present invention have found, after having extensively studied to solve the above problems, that a formed article, excellent in acoustically matching layer characteristics (i.e., an article formed into an acoustically matching layer), can be produced by a simple process when a carbodiimide resin is contained as the essential component in the composition for the article. The present invention is developed based on the above knowledge.

The first aspect of the present invention provides a composition for an acoustically matching layer, containing a carbodiimide resin as the main component.

The second aspect of the present invention provides the composition for an acoustically matching layer according to the first aspect, wherein inorganic hollow bodies are further contained.

The third aspect of the present invention provides the composition for an acoustically matching layer according to the second aspect, wherein the inorganic hollow bodies are glass balloons.

The fourth aspect of the present invention provides the composition for an acoustically matching layer according to the second aspect, wherein a reactive resin is contained in addition to the inorganic hollow bodies.

The fifth aspect of the present invention provides the composition for an acoustically matching layer according to the fourth aspect, wherein the reactive resin is an epoxy or phenol resin.

The sixth aspect of the present invention provides the composition for an acoustically matching layer according to the first aspect, wherein the carbodiimide resin is totally carbodiimidated.

The seventh aspect of the present invention provides the composition for an acoustically matching layer according to the first aspect, wherein the carbodiimide resin is partly carbodiimidated.

The eighth aspect of the present invention provides a process for producing a formed article of an acoustically matching layer, characterized by curing and forming, under heating in a mold for the formed article, the composition for an acoustically matching layer according to one of the first to sixth aspects.

The ninth aspect of the present invention provides a process for producing a formed article of an acoustically matching layer, characterized by foaming, curing and forming, under heating in a mold for the formed article, the composition for an acoustically matching layer according to the seventh aspect.

The tenth aspect of the present invention provides the process for producing a formed article of an acoustically matching layer according to the eighth or ninth aspect, wherein the composition is heated at 200 to 250° C.

The 11th aspect of the present invention provides the process for producing a formed article of an acoustically matching layer according to the eighth or ninth aspect, wherein the resultant formed article has a density of around 0.4 to 0.7 g/cm³.

The 12th aspect of the present invention provides an ultrasonic transducer which uses the composition for an acoustically matching layer according to one of the first to seventh aspects.

The 13th aspect of the present invention provides an ultrasonic transducer which uses the formed article of an acoustically matching layer produced by the process according to one of the eighth to 11th aspects.

DETAILED DESCRIPTION OF THE INVENTION

The present invention is described below in detail.

The composition of the present invention for an acoustically matching layer contains a carbodiimide resin as the main component.

1. Carbodiimide Resin

The carbodiimide resin for the composition of the present invention for an acoustically matching layer is represented by the general formula (1):

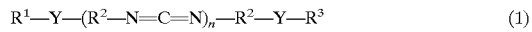
(1)

Wherein, $R^1$ and $R^3$ are each hydrogen or an organic residue of 1 to 40 carbon atoms, which is a compound having a functional group reactive with the isocyanate group left by the functional group, and may be the same or different; $R^2$ is an organic residue which is a diisocyanate left by the isocyanate group, where the diisocyanates may be different; Y is a bond formed by the isocyanate group and a functional group reactive with the isocyanate group; and "n" is an integer of 1 or more, preferably 2 to 100, representing average degree of polymerization. In addition, each of $R^1$—Y and Y—$R^3$ may be the isocyanate group halfway in the reaction to be converted into the carbodiimide.

In more detail, $R^1$ or $R^3$ in the general formula (1) is at least one type of segment composed of a residue represented by a compound having a functional group or bond reactive with the isocyanate group.

The representative examples of the functional group or bond include:
(a) hydroxide group —OH (including $H_2O$)
(b) mercapto group —SH
(c) amino group —$NH_2$
(d) carboxyl group —COOH
(e) isocyanate group —NCO
(f) urethane bond —NHCOO—
(g) urea bond —NHCONH—
(h) amido bond —NHCO—
(i) carbodiimide bond —NCN—
(j) dimerized isocyanate bond —$C_2N_2O_2$—

The examples of bond Y include the following bonds, when $R^1$ or $R^3$ in the general formula (1) is an residue represented by a compound having a functional group or bond (a) to (j):
(a') urethane bond —NHCOO—
(b') thiourethane bond —NHCSO—
(c') urea bond —NHCONH—
(d') amido bond —NHCO—
(e') carbodiimide bond —NCN— (in the presence of a catalyst) or dimerized isocyanate bond —$C_2N_2O_2$—
(f') allophanate —$C_2HN_2O_3$—
(g') burrette bond —$C_2H_2N_3O_2$—
(h') acylurea bond —$C_2HN_2O_2$—
(i') uretonimine bond —$C_2N_3O$—
(j') trimerized isocyanate bond —$C_3N_3O_3$—

The isocyanates as the starting compounds for producing the carbodiimide resin for the present invention include those having per molecule at least 2 isocyanate groups, preferably one or more isocyanates selected from bifunctional isocyanate, hexamethylene diisocyanate (hereinafter sometimes referred to as HDI), hydrogenated xylylene diisocyanate ($H_6$XDI), xylylene diisocyanate (XDI), 2,2,4-trimethylhexamethylene diisocyanate (TMHDI), 1,12-diisocyanatedodecane (DDI), norbornane diisocyanate (NBDI), 4,4'-dicyclohexylmethane diisocyanate (HMDI) and tetramethylxylylene diisocyanate (TMXDI), isophorone diisocyanate (IPDI), 2,4,6-triisopropylphenyl diisocyanate (TIDI), 4,4'-diphenylmethane diisocyanate (MDI), tolylene diisocyanate (TDI) and hydrogenated tolylene diisocyanate (HTDI), among others.

Monoisocyanate compounds are also useful for the present invention. Phenyl isocyanate (PhI), cyclohexyl isocyanate and hexamethylene isocyanate can be cited as the examples of these compounds.

The first step for producing the carbodiimide resin for the present invention is heating the above-described isocyanate in the presence of a carbodiimidation catalyst.

The catalyst useful for the present invention is not limited, so long as it can accelerate the carbodiimidation reaction, but organophosphorus-based compounds are suitable, in particular phospholene oxides for their activity.

More specifically, these phospholene oxides include 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and a double-bond isomer thereof, of which 3-methyl-1-phenyl-2-phospholene-1-oxide is more suitable because of its industrial availability. The timing of incorporation of the carbodiimidation catalyst is not limited, i.e., it may be incorporated before, during or after the isocyanate is heated. It is however preferable to incorporate the catalyst while the reaction system is at a relatively low temperature for safety considerations.

The first step for producing the carbodiimide resin for the present invention is heating the above-described isocyanate in the presence of a carbodiimidation catalyst, as described earlier. The synthesis process may be effected in the presence or absence of a solvent, or a solvent may be added while the reaction process is proceeding. Whether a solvent is used or not, or when it is added, if used, can be selected depending on specific purposes or objects of the acoustically matching layer for which the carbodiimide resin is used.

The specific examples of the solvents useful for the present invention include ketones, e.g., acetone, methylethylketone, methylisobutylketone and cyclohexanone; esters, e.g., ethyl acetate, butyl acetate, ethyl propionate and cellosolve acetate; aliphatic or aromatic hydrocarbons, e.g., pentane, 2-methylbutane, n-hexane, cyclohexane, 2-methylpentane, 2,2-dimethylbutane, 2,3-dimethylbutane, heptane, n-octane, isooctane, 2,2,3-trimethylpentane, decane, nonane, cyclopentane, methylcyclopentane, methylcyclohexane, ethylcyclohexane, p-menthane, dicyclohexyl, benzene, toluene, xylene and ethylbenzene; halogenated hydrocarbons, e.g., carbon tetrachloride, trichloroethylene, chlorobenzene and tetrabromoethane; ethers, e.g., ethyl ether, dimethyl ether, trioxane and tetrahydrofuran; acetals, e.g., methylal and diethyl acetal; and sulfur- or nitrogen containing organic compounds, e.g., nitropropene, nitrobenzene, pyridine, dimethylformamide and dimethylsulfoxide. The solvent is not limited, so long as it is not harmful to the isocyanate or carbodiimide group during the synthesis process, and can be selected, as required, for a specific purpose of the polymerization process. These solvents may be used either individually or in combination.

The carbodiimide resins useful for the present invention fall into two general types. One is completely carbodiimidated and contains no unreacted isocyanate group, produced in the presence of a solvent and carbodiimidation catalyst. The other is partly carbodiimidated and expanded, and contains unreacted isocyanate group remaining, produced in the absence of a solvent but in the presence of a carbodiimidation catalyst. Each type is fittingly selected as required for specific purposes. For example, the former will be selected when the carbodiimide resin is incorporated with inorganic hollow bodies (e.g., glass balloons) for the acoustically matching layer. When the acoustically matching layer is made only of the carbodiimide resin, and when the acoustically matching layer is made of the latter resin, i.e., partly carbodiimidated and expanded resin, will be a choice.

2. Composition for the Acoustically Matching Layer

The composition of the present invention for an acoustically matching layer contains a carbodiimide resin as the main component. The carbodiimide resins useful for the present invention fall into two general types: (A) completely carbodiimidated; and (B) partly carbodiimidated and expanded, and containing the remaining unreacted isocyanate group.

The composition for acoustically matching layer containing the completely carbodiimidated resin (A) as the main component may contain one or more other components, e.g., reactive resin other than carbodiimide resin, e.g., epoxy or phenol resin, and inorganic hollow bodies (e.g., hollow glass particles).

The reactive resin, e.g., epoxy or phenol resin, is used mainly for improving formability of the composition of the carbodiimidated resin incorporated with inorganic hollow bodies (e.g., glass balloons). Such a reactive resin may be incorporated as the composition of the present invention for an acoustically matching layer within limits not harmful to the carbodiimidated resin as the main component.

The content of the reactive resin, e.g., epoxy or phenol resin, can be set at any level for the composition for an acoustically matching layer within limits not harmful to the carbodiimidated resin. However, it is normally 0 to 100 parts by weight per 100 parts by weight of the carbodiimide resin, preferably 20 to 50 parts by weight.

The content of the inorganic hollow bodies (e.g., glass balloons) depends on the density level that the acoustically matching layer requires, and it is fittingly selected while taking into consideration the density of the resin with a carbodiimide as the main component and that of inorganic hollow bodies (e.g., glass balloons). However, it is normally 50 to 200 parts by weight per 100 parts by weight of the carbodiimide resin.

The density level that the acoustically matching layer requires is around 0.4 to 0.7 $g/cm^3$, more preferably around 0.5 $g/cm^3$.

Next, the process for producing the acoustically matching layer is described, where the composition for acoustically matching layer containing the completely carbodiimidated carbodiimide resin (A) as the main component is used.

The acoustically matching layer of the composition of a carbodiimide resin incorporated with inorganic hollow bodies (e.g., glass balloons) may be formed by, e.g., heating the composition. The resin/hollow body mixing ratio is fittingly set for the target density of the composition.

The form of the carbodiimide resin to be used for the present invention is not limited; it may be solid (powdery) or liquid (solution). Moreover, the carbodiimide resin may be further incorporated with another resin component, e.g., a reactive resin (e.g., epoxy or phenol resin) within limits not harmful to the acoustically matching layer.

The process for forming under heating the composition of carbodiimide resin incorporated with inorganic hollow bodies (e.g., glass balloons) pressurizes and then heats the composition in a mold for the acoustically matching layer preferably at 200° C. or higher (around 250° C.), at which it is cured and formed into the acoustically matching layer.

Next, the process for producing the acoustically matching layer from the composition with a partly carbodiimidated carbodiimide resin (B) as the main component is described, where the composition for the acoustically matching layer is expanded and contains the remaining unreacted isocyanate group.

The carbodiimide resin for the partly carbodiimidated, expanded body is produced by a process for synthesizing the resin from an isocyanate, where the reaction is terminated to keep the resin low in molecular weight while the terminals are left unsealed.

The process for forming the carbodiimide resin, while expanding it under heating, heats the resin in a mold for the acoustically matching layer preferably at 200° C. or higher (around 250° C.). This heating causes the decarboxylation/carbodiimidation in the presence of the residual isocyanate, with the curing reaction proceeding simultaneously with expansion of the resin. The formed article of an acoustically matching layer is thus produced by expanding, curing and forming the carbodiimide resin.

Thus, the formed article having a suitably low density for the acoustically matching layer can be produced, and the formed article having an intended density can be produced by, e.g., controlling the reaction rate during the initial stage.

The acoustically matching layer (formed article or body) of the composition of the present invention for an acoustically matching layer has stable acoustically matching layer characteristics even at high temperature, resulting from the high resistance to heat of the carbodiimide resin as the main component, the acoustically matching layer characteristics including insensitivity to moisture resulting from low moisture-absorptivity of the carbodiimide resin itself, making the characteristics stable even under a high humidity condition. Moreover, the carbodiimide resin itself has high adhesion to the inorganic hollow bodies (e.g., glass balloons) to stably secure the acoustically matching layer characteristics without needing a special treatment, e.g., treatment with a coupling agent or the like. Still more, the composition of the present invention for an acoustically matching layer has a sufficiently high mechanical strength, with the result that the formed body of acoustically matching layer can be easily processed.

The formed article of acoustically matching layer, made of the composition of the present invention for acoustically matching layer, has excellent acoustically matching layer characteristics as described above, and hence is excellent in stability when used for an ultrasonic transducer. The process of the present invention for producing a formed article of an acoustically matching layer can give a highly stable acoustically matching layer element for ultrasonic transducers by a simple procedure.

EXAMPLES

The present invention is described in more detail by EXAMPLES and COMPARATIVE EXAMPLES, which by no means limit the present invention.

[Synthesis of Carbodiimide Resin]

Synthesis of the carbodiimide resins for the present invention is described before EXAMPLES and COMPARATIVE EXAMPLES for preparing the acoustically matching layers.

Synthesis Example 1

A 2 L flask, equipped with a condenser tube and stirrer, was charged with 180 g of 4,4'-diphenylmethane diisocyanate (MDI) and 12 g of phenyl isocyanate (PhI), to which 600 g of tetrahydrofuran (THF) and 600 g of ethyl acetate as solvents, and 0.4 g of 3-methyl-1-phenyl-2-phosphlene-1-oxide as a carbodiimidation catalyst (which was also used in SYNTHESIS EXAMPLE 2 and is referred to as the carbodiimidation catalyst) were added, and the reactions were allowed to proceed at 60° C. for 5 hours under reflux. The powder separating out when the reaction effluent was cooled was filtered and dried under a vacuum, to prepare 125 g of a carbodiimide resin powder (hereinafter referred to as the carbodiimide resin powder (1)).

Synthesis Example 2

A mixed solution of 50.0 g of tolylene diisocyanate (TDI) and 1.0 g of the carbodiimidation catalyst, put in a glass container, was allowed to stand at 70° C. for 7 hours, to prepare a partly carbodiimidated, expanded body. It was cooled to room temperature, and the resultant solid was crushed to prepare 37.1 g of a carbodiimide resin powder (hereinafter referred to as the carbodiimide resin powder (2)).

Example 1

A mixture of 100 parts by weight of the carbodiimide resin powder (1) prepared in SYNTHESIS EXAMPLE 1 and 100 parts by weight of glass balloons (diameter: 50 µm) was heated at 200° C. for 1 hour in a mold (diameter: 15 mm). The resin powder was molten and cured under the above conditions into the formed article (1) for an acoustically matching layer.

Example 2

A mixture of 100 parts by weight of the carbodiimide resin powder (1) prepared in SYNTHESIS EXAMPLE 1, 50 parts by weight of bisphenol A type epoxy resin (Yuka Shell's Epicoat 828) and 140 parts by weight of glass balloons (diameter: 50 µm) was heated at 200° C. for 1 hour in a mold (diameter: 15 mm). The resin powder was cured under the above conditions into the formed article (2) for an acoustically matching layer.

Example 3

The carbodiimide resin powder (2) prepared in SYNTHESIS EXAMPLE 2 was heated at 200° C. for 1 hour in a mold (diameter: 15 mm). The resin powder was molten, cured and expanded under the above conditions into the formed article (3) for acoustically matching layer.

Comparative Example 1

A uniform mixture of 100 parts by weight of bisphenol A type epoxy resin (Yuka Shell's Epicoat 828), 8.2 parts by weight of dicyandiamide and 2 parts by weight of imidazole (Shikoku Chemicals' Curesol 2PZ-CNS) was prepared by a 3-roll mill. 100 parts by weight of this mixture, i.e., the epoxy resin composition (1), was uniformly incorporated with 200 parts by weight of glass balloons (average diameter: 50 µm), and heated and cured at 150° C. for 1 hour in a mold (diameter: 15 mm), to prepare the formed article (4) for acoustically matching layer.

Comparative Example 2

Dried cork was cut into a circular shape (diameter: 15 mm), to prepare the formed article (5) for an acoustically matching layer.

Comparative Example 3

An attempt was made to prepare a formed article (diameter: 15 mm) for acoustically matching layer by cutting a commercial porous ceramic board having a specific gravity of 0.5. However, it failed to give a target article for an acoustically matching layer, because the board was cracked and chipped during the cutting step.

<Evaluation/Testing Procedures>

Each of the formed articles of acoustically matching layers prepared in EXAMPLES 1 to 3 and COMPARATIVE EXAMPLES 1 and 2 was machined to have a thickness of $\lambda/4$, coated with a piezoelectric element on one side by pressing, and sealed in a metallic case to prepare an ultrasonic transducer element.

Each ultrasonic transducer element was observed to determine whether it had the acoustically matching layer characteristics at normal temperature. It was also left under the conditions of 85° C. and 85% RH for 100 hours, to observe/evaluate changes in the characteristics. The results are given in Table 1.

Moldability of each formed article of an acoustically matching layer was visually observed, and evaluated according to the following standards:

[⊚]: showing best conditions

[o]: showing good conditions and usable

[x]: unusable

Each ultrasonic transducer element was also observed for its acoustically matching layer characteristics before and after it was left under the conditions of 85° C. and 85% RH for 100 hours, and evaluated according to the following standards:

[⊚]: very good to show the acoustically matching layer characteristics

[o]: good and usable

[x]: unusable because of insufficient acoustically matching layer characteristics

TABLE 1

| EXAMPLES/COMPARATIVE EXAMPLE | Moldability | Acoustically matching layer characteristics | Characteristics after the element was left for 100 hours |
| --- | --- | --- | --- |
| EXAMPLE 1 | ◎ | ◎ | ◎ |
| EXAMPLE 2 | ◎ | ◎ | ◎ |
| EXAMPLE 3 | ◎ | ◎ | ◎ |
| COMPARATIVE EXAMPLES 1 | ○ | x | — |
| COMPARATIVE EXAMPLES 2 | ◎ | ○ | x |
| COMPARATIVE EXAMPLES 3 | x | — | — |

It is apparent, as shown in Table 1 which gives the results observed in EXAMPLES and COMPARATIVE EXAMPLES, that each of the formed articles of acoustically matching layers prepared in EXAMPLES 1 to 3, in which the carbodiimide resin for the present invention is used, is usable as an acoustically matching layer for ultrasonic transducers, shows no changes in the acoustically matching layer characteristics even when left for an extended period, and hence is good.

On the other hand, the formed article (4) prepared in COMPARATIVE EXAMPLE 1 for an acoustically matching layer, which uses an epoxy resin or the like instead of the carbodiimide resin for the present invention, lacks the acoustically matching layer characteristics, and the formed article (5) prepared in COMPARATIVE EXAMPLE 2 for acoustically matching layer, which is made of cork, also lacks the acoustically matching layer characteristics when left for an extended period, because of deteriorated characteristics during this period. Therefore, they cannot be stably used as an acoustically matching layer for ultrasonic transducers.

The composition of the present invention containing a carbodiimide resin as a main component for acoustically matching layer has a sufficient mechanical strength to allow itself to be easily formed into a shape, where the composition may comprise the carbodiimide resin as the essentially sole component, or inorganic hollow bodies (e.g., glass balloons) mixed in the carbodiimide resin. The formed article of an acoustically matching layer, produced by curing under heating the composition achieves the excellent effect of stable acoustically matching layer characteristics over extended periods even under high temperature, high humidity conditions.

Therefore, the formed article of an acoustically matching layer, made of the composition of the present invention for an acoustically matching layer, having the above-described excellent characteristics, is highly stable for use for ultrasonic transducers. The process of the present invention gives the acoustically matching layer of high stability for ultrasonic transducers by a simple procedure.

What is claimed is:

1. A composition for an acoustically matching layer, containing a carbodiimide resin as the main component; wherein inorganic hollow bodies are further contained; wherein a reactive resin is contained in addition to said inorganic hollow bodies; and, wherein said reactive resin is an epoxy or phenol resin.

* * * * *